(12) United States Patent
Shimada

(10) Patent No.: US 9,709,116 B2
(45) Date of Patent: Jul. 18, 2017

(54) VIBRATION ISOLATING DEVICE

(71) Applicant: YAMASHITA RUBBER KABUSHIKI KAISHA, Fujimino-shi, Saitama (JP)

(72) Inventor: Hitoshi Shimada, Fujimino (JP)

(73) Assignee: YAMASHITA RUBBER KABUSHIKI KAISHA, Fujimino-Shi (JP)

( * ) Notice: Subject to any disclaimer, the term of this patent is extended or adjusted under 35 U.S.C. 154(b) by 119 days.

(21) Appl. No.: 14/421,527

(22) PCT Filed: Aug. 23, 2013

(86) PCT No.: PCT/JP2013/072587
§ 371 (c)(1),
(2) Date: Feb. 13, 2015

(87) PCT Pub. No.: WO2014/030748
PCT Pub. Date: Feb. 27, 2014

(65) Prior Publication Data
US 2015/0204405 A1   Jul. 23, 2015

(30) Foreign Application Priority Data
Aug. 24, 2012 (JP) ................................ 2012-185944

(51) Int. Cl.
*F16F 1/38* (2006.01)
*F16F 1/387* (2006.01)

(52) U.S. Cl.
CPC .............. *F16F 1/38* (2013.01); *F16F 1/3828* (2013.01); *F16F 1/3849* (2013.01); *F16F 1/3873* (2013.01)

(58) Field of Classification Search
CPC .......... F16F 1/3828; F16F 1/3873; F16F 1/38; F16F 1/3849

(Continued)

(56) References Cited

U.S. PATENT DOCUMENTS 6,688,588 B2 * 2/2004 Vossel ................ F16F 13/1418
                                                    267/140.12
7,350,778 B2 * 4/2008 Endo .................... F16F 1/3849
                                                    248/60

(Continued)

FOREIGN PATENT DOCUMENTS

JP      08-061409       3/1996
JP      2004-092803     3/2004

(Continued)

OTHER PUBLICATIONS

Machine Translation in English for JP 2006-77838A; Inventor: Niina; 6 pages; Retrieve Date: Dec. 28, 2015.*

(Continued)

*Primary Examiner* — Thomas J Williams
*Assistant Examiner* — Mariano Sy
(74) *Attorney, Agent, or Firm* — Rankin, Hill & Clark LLP

(57) ABSTRACT

A large ring part of a torque rod includes an outer frame section, an inner member, an intermediate ring and an elastic vibration isolating main body. The outer frame section and the intermediate ring are integrally combined with the elastic vibration isolating main body. An inner clearance is provided between the intermediate ring and the inner member such as to surround the circumference of the inner member. The intermediate ring is movable relative to the inner member in the axial direction. With respect to the vibration in the direction of a mounting shaft, the outer frame section, the intermediate ring and the elastic vibration isolating main body move together in the axial direction in relation to the inner member, whereby the spring in the direction of the mounting shaft is weakened and the resonance frequency of the rigid body resonance in the direction of the mounting shaft is decreased.

8 Claims, 20 Drawing Sheets

(58) Field of Classification Search
USPC .............................. 267/139, 141.2, 141, 293
See application file for complete search history.

(56) References Cited

U.S. PATENT DOCUMENTS

| | | | | |
|---|---|---|---|---|
| 8,167,286 B2* | 5/2012 | Hirano | ...................... | F16F 1/38 |
| | | | | 188/379 |
| 8,684,341 B2* | 4/2014 | Nishimae | .............. | F16F 1/3849 |
| | | | | 267/141 |
| 8,794,605 B2* | 8/2014 | Mizobe | ................ | F16F 1/3828 |
| | | | | 180/296 |

FOREIGN PATENT DOCUMENTS

| | | | |
|---|---|---|---|
| JP | 2006-077838 | | 3/2006 |
| JP | 2006077838 A | * | 3/2006 |
| JP | 2007-309441 | | 11/2007 |
| JP | 2009-002419 | | 1/2009 |
| JP | 2009002419 A | * | 1/2009 |

OTHER PUBLICATIONS

Machine Translation in English for JP 2009-2419A; lnventtor:Kubo et al.; 6 pages; Retrieve Date: Dec. 28, 2015.*
International Search Report, Date of mailing Dec. 10, 2013 (Dec. 10, 2013).

* cited by examiner

VIBRATION ISOLATING DEVICE

TECHNICAL FIELD

The present invention relates to a vibration isolating device provided between a vibration source such as an engine or the like and a vibration transmitted part such as a vehicle body or the like, and, more particularly, to the vibration isolating device capable of controlling a resonance frequency of rigid body resonance in a direction of a mounting shaft relative to the vibration transmitted part side.

BACKGROUND ART

As an example of a vibration isolating device provided between a vibration source such as an engine or the like and a vibration transmitted part such as a vehicle body or the like, there is a torque rod. This torque rod is provided at both ends thereof with rubber bushings one of which is mounted on the side of the vibration source such as the engine or the like, and the other of which is mounted on the side of the vibration transmitted part such as the vehicle body or the like.

Moreover, as the bushing used for a connecting portion relative to the vibration transmitted part, there is a cylindrical bushing. This cylindrical bushing is composed of an outer cylinder, an inner cylinder and an elastic vibration isolation main body connecting the outer cylinder and the inner cylinder. One end of the torque rod is mounted through the inner cylinder on the vibration transmitted part such as the vehicle body by a mounting shaft, and the other end thereof is mounted on the vibration source side such as the engine or the like (as an example, see a patent reference 1).

PRIOR ART REFERENCE

Patent reference 1: Japanese Patent Laid-open Publication JPH08-61409 A.

DISCLOSURE OF THE INVENTION

Problem to be Solved by the Invention

By the way, this type of torque rod produces rigid body resonance due to a vibration by the engine or the like in response to each of vibrations in a longitudinal direction and in a direction of the mounting shaft orthogonal to the longitudinal direction, for instance. In these vibrations, particularly, the vibration in the direction of the mounting shaft has an influence upon riding comfort, so that it is required to make it hard to transmit the vibration in the direction of the mounting shaft to the vehicle body side.

FIG. 20 is a graph indicating a relationship between the resonance frequency and vibration transmission efficiency (transmissibility of vibration) in the rigid body resonance, wherein a rigid body resonance curve of the prior art shown by a phantom line relates to the torque rod having a cylindrical type bushing in which the inner cylinder to be connected to the mounting shaft on the vehicle body side is integrally formed with the elastic vibration isolation main body as shown in above patent reference. In this rigid body resonance curve, the prior art has a peak (maximum value) at a comparatively high frequency H2, and high vibration transmission efficiency (the transmissibility E2 of vibration at a frequency H3) in a frequency range of H3 to H4 in which the vibration isolation is desired. This frequency range of H3 to H4 is close to the resonance frequency of the vehicle body or the like and the vibration isolation at the high level is required. However, since in such high transmissibility E2 of vibration the vibration isolation is insufficient, the lower transmissibility E1 of vibration is required, for instance.

Accordingly, as indicated by a rigid body resonance curve of a solid line, if the peak frequency is lowered to H1, the transmissibility of vibration of the frequency H3 in the frequency range in which the vibration isolation is desired can be brought to a lower value E1 to be aimed. Therefore, when the peak frequency (hereinafter, referred to as the resonance frequency) of the rigid body resonance is lowered, the transmissibility of vibration can be decreased and the vibration isolation ability can be increased.

Accordingly, it is an objective of the present invention to allow the resonance frequency to be controllable so as to lower effectively the resonance frequency of the rigid body resonance in the direction of the mounting shaft.

Means for Solving the Problem

To solve the above described problem, a vibration isolating device according to a first feature of the present invention comprises an outer frame section, an inner member arranged on the inside of the outer frame section, and an elastic vibration isolation main body arranged between the outer frame section and the inner member, wherein the outer frame section and the elastic vibration isolation main body are integrated into an outer structure section, and an inner clearance configured to surround the inner member is provided between the outer structure section and the inner member.

According to a second feature of the present invention, in addition to the first feature, an intermediate ring configured to surround the inner member is arranged between the outer frame section and the inner member. The intermediate ring and the elastic vibration isolation main body are integrated into the outer structure section.

According to a third feature of the present invention, in addition to the second feature, an inner circumferential surface of the outer structure section is formed of the intermediate ring, and an outer circumference covering section of an elastic member is provided to cover an outer circumference of the inner member. The inner clearance is formed between the outer circumference covering section and the intermediate ring.

According to a fourth feature of the present invention, in addition to any of the first to third features, the elastic vibration isolation main body is provided with axially extending through bored holes located on either side of the inner member in a main vibration inputting direction, and a portion between the bored holes is formed in the shape of a rubber foot.

According to a fifth feature of the present invention, in addition to any of the first to fourth features, a retainer flange projecting outwardly in a radial direction is provided on at least one end in an axial direction of the inner member. The retainer flange overlaps with the outside of the outer structure section in the axial direction.

According to a sixth feature of the present invention, in addition to the fifth feature, a gap is provided between the retainer flange and the outer structure section.

According to a seventh feature of the present invention, in addition to the fifth or sixth feature, the retainer flange is formed integral with the outer circumference covering section.

According to an eighth feature of the present invention, in addition to the seventh feature, an end in the axial direction of the outer circumference covering section is provided with a recess of a small diameter for accommodating the retainer flange in a folded fashion.

According to a ninth feature of the present invention, in addition to the seventh or eighth feature, zero clearance is provided between the retainer flange and an axial end of the intermediate ring.

According to a tenth feature of the present invention, in addition to any of the second to fifth features, the intermediate ring is integrally embedded in the outer structure section, and an inner circumference of the intermediate ring is covered with an elastic body to form an inner circumference covering section. The inner clearance is formed between the inner circumference covering section and the outer circumference of the inner member.

According to an eleventh feature of the present invention, in addition to the tenth feature, the retainer flange comprises an integral retainer flange which is integrally formed with one end in the axial direction of the inner member, and a separate retainer flange which is formed separately to be mounted on the other end in the axial direction of the inner member.

According to a twelfth feature of the present invention, in addition to any of the first to eleventh features, the inner clearance is formed in the shape of a ring extending around a full circumference in a circumferential direction and over a full length in the axial direction of the inner member, and the outer structure section and the inner member are separated in such a manner as to be movable relative to each other without sliding resistance.

According to a thirteenth feature of the present invention, in addition to any of the first to eleventh features, the inner clearance comprises a bottomed hole portion which extends inwardly from one end side of the inner member and which is formed around the inner member in the axial direction thereof.

According to a fourteenth feature of the present invention, in addition to any of the first to eleventh features, the elastic vibration isolation main body integrally connects the outer frame section and the inner member, and the inner clearance surrounding the inner member comprises a plurality of hole shaped portions which are arranged at spaced intervals in the circumferential direction and which extend in the axial direction of the inner member within a circumferential portion of the elastic vibration isolation main body located around the inner member.

According to a fifteenth feature of the present invention, in addition to the fourteenth feature, the hole shaped portions are formed by allowing through holes which passing through the elastic vibration isolation main body in the axial direction of the inner member, to be mixed with bottomed hole shaped portions which extend inwardly from the one end side of the inner member along the axial direction of the inner member.

According to a sixteenth feature of the present invention, in addition to any of the first to fifteenth features, there is provided a retainer means for connecting the outer structure section and the inner member in such a manner as not to be separated from each other.

According to a seventeenth feature of the present invention, in addition to the sixteenth feature, the retainer means is a retainer flange which is provided in at least one end portion in the axial direction of the inner member and which projects outwardly in the radial direction.

According to an eighteenth feature of the present invention, in addition to the sixteenth feature, the retainer means is a connecting portion of an elastic member which establishes an integral connection between the outer structure section and the inner member.

Effects of the Invention

According to the first feature of the present invention, since the inner clearance is provided between the outer structure section and the inner member, a spring in the axial direction is decreased when the vibration is inputted in the axial direction of the inner member corresponding to the direction of the mounting shaft. Therefore, the resonance frequency of the rigid body resonance is lowered whereby the transmissibility of vibration can be decreased.

Accordingly, the resonance frequency of the rigid body resonance can be controlled by adjusting the spring in the axial direction, whereby the vibration can be effectively isolated in a predetermined range of the resonance frequency to be isolated.

According to the second feature of the present invention, the intermediate ring configured to surround the inner member is arranged between the outer frame section and the inner member, and the intermediate ring and the elastic vibration isolation main body are integrated into the outer structure section. With this construction, even if the inner member is separated, the elastic vibration isolation main body can be elastically deformed between the outer frame section and the intermediate ring in an inputting direction of a main vibration in a direction orthogonal to an axis of the inner member, whereby the spring in the main vibration inputting direction can be maintained sufficiently.

According to the third feature of the present invention, the inner clearance is formed between the intermediate ring which forms the inner circumferential surface of the outer structure section and the outer circumference covering section of the elastic member which covers the outer circumference of the inner member. Therefore, even if the intermediate ring and the inner member come into contact with each other by relative movement in the axial direction, a contact noise can be suppressed by buffer action of the outer circumference covering section.

According to the fourth feature of the present invention, the elastic vibration isolation main body is provided with the bored holes, and the portion between the bored holes is formed in the shape of a rubber foot. Therefore, it is possible to obtain a suitable spring characteristic that allows the spring in the main vibration inputting direction to be varied in two steps. In addition, with provision of the intermediate ring, even if such bored holes are provided, it is possible to realize a predetermined spring characteristic.

According to the fifth feature of the present invention, the retainer flange projecting outwardly in a radial direction is provided on at least one end in the axial direction of the inner member. The retainer flange overlaps with the outside of the outer structure section in the axial direction. With this construction, even if the inner member is axially movable in relation to the outer structure section, the retainer flange can function as a stopper for preventing the inner member from slipping out of and being separated from the outer structure section, and also it can function as a side stopper for regulating a movement stroke in the axial direction which is more than a predetermined stroke.

According to the sixth feature of the present invention, since the gap is provided between the retainer flange and the outer structure section, the predetermined movement stroke in the axial direction can be obtained. Moreover, even if the gap is provided, the retainer flange can prevent foreign matter such as water, dust or the like from entering the gap and the inner clearance.

According to the seventh feature of the present invention, since the retainer flange is formed integral with the outer circumference covering section, the formation of the retainer flange can be easily performed.

According to the eighth feature of the present invention, the end in the axial direction of the outer circumference covering section is provided with the recess of small diameter for accommodating the retainer flange in the folded fashion. Therefore, when the inner member is inserted into the intermediate ring, the retainer flange which comes into contact with the axial end of the intermediate ring can be folded onto the small diameter recess to be accommodated therein, whereby the inner member can be easily inserted.

According to the ninth feature of the present invention, since the zero clearance is provided between the retainer flange and the axial end of the intermediate ring, a space between the retainer flange and an end in the axial direction of the intermediate ring can be closed by the retainer flange, whereby the foreign matter can be accurately prevented from entering the inner clearance formed between the intermediate ring and the inner member.

Moreover, the retainer flange is integrally formed in the elastic vibration isolation main body. Therefore, even if the axial end of the intermediate ring is previously brought into contact with the retainer flange, the predetermined stroke can be obtained, and the retainer flange can function as a simple side stopper for preventing slipping-out of a component at the time of handling products before mounting on the vehicle body or the like.

According to the tenth feature of the present invention, the intermediate ring is integrally embedded in the outer structure section, and the inner circumference of the intermediate ring is covered with the elastic vibration isolation main body to form the inner circumference covering section. The inner clearance is formed between the inner circumference covering section and the outer circumference of the inner member. With this construction, the inner circumference covering section can be formed integral with the elastic vibration isolation main body. Moreover, since the intermediate ring is integrally embedded in the outer structure section, rust prevention or the like can be effected. In addition, the contact noise can be suppressed by buffer action of the inner circumference covering section when contacting the inner member.

According to the eleventh feature of the present invention, the retainer flange comprises an integral retainer flange which is formed integral with the one end in the axial direction of the inner member, and the separate retainer flange which is formed separately to be mounted on the other end in the axial direction of the inner member. Therefore, the assembling operation can be performed such that, in the condition where the separate retainer flange is not attached to the inner member, the other end in the axial direction of the inner member is inserted into and passes through the inside of the intermediate ring, and, thereafter, the separate retainer flange is attached to the other end in the axial direction of the inner member.

Moreover, the integral retainer flange on one side can be firmly formed integral with the one end in the axial direction of the inner member, whereby the attachment at the time of assembling is not required.

According to the twelfth feature of the present invention, the inner clearance which is provided between the outer structure section and the inner member is formed in the shape of a ring extending around the full circumference in the circumferential direction of the inner member and over the full length in the axial direction of the inner member, and the outer structure section and the inner member are separated in such a manner as to be movable relative to each other without sliding resistance. Therefore, when the vibration is inputted in the axial direction corresponding to the direction of the mounting shaft, the outer structure section and the inner member are moved relative to each other without sliding resistance, whereby it is possible to reduce the spring in the axial direction.

According to the thirteenth feature of the present invention, since the inner clearance comprises the bottomed hole section which extends inwardly from one end side of the inner member and which is formed around the inner member in the axial direction thereof, the adjustment of the spring in the axial direction can be easily performed by adjusting the depth in the axial direction and the length in the circumferential direction.

According to the fourteenth feature of the present invention, since the inner clearance is formed with the plurality of the hole shaped portions which surround the inner member and are arranged at spaced intervals in the circumferential direction, the outer structure section and the inner member can be connected integral with each other at a place where the hole shaped portions are not formed, and the adjustment of the spring can be easily performed by means of the number or size of the hole shaped portions.

According to the fifteenth feature of the present invention, since the hole shaped portions are formed by the mixture of the through holes and the bottomed hole shaped portions, the adjustment of the spring in the axial direction can be performed more easily.

According to the sixteenth feature of the present invention, since there is provided the retainer means for connecting the outer structure section and the inner member in such a manner as not to be separated from each other, when handling the vibration isolating device, the inner member and the outer structure section can be handled together, whereby the handling becomes more convenient.

According to the seventeenth feature of the present invention, since the retainer means is the retainer flange, the retainer flange can be allowed to function as a side stopper, and the water and dust or the like can be prevented from entering the inner clearance.

According to then eighteenth feature of the present invention, the retainer means comprises the connecting portion of an elastic member which establishes the integral connection between the outer structure section and the inner member. Therefore, the outer structure section and the inner member can be formed integrally, including the connecting portion, whereby the manufacturing can be facilitated.

BEST MODE FOR CARRYING OUT THE INVENTION

Hereinafter, an embodiment of the present invention applied to a torque rod as an example of a vibration isolating device will be explained with reference to drawings.

Figure 1:
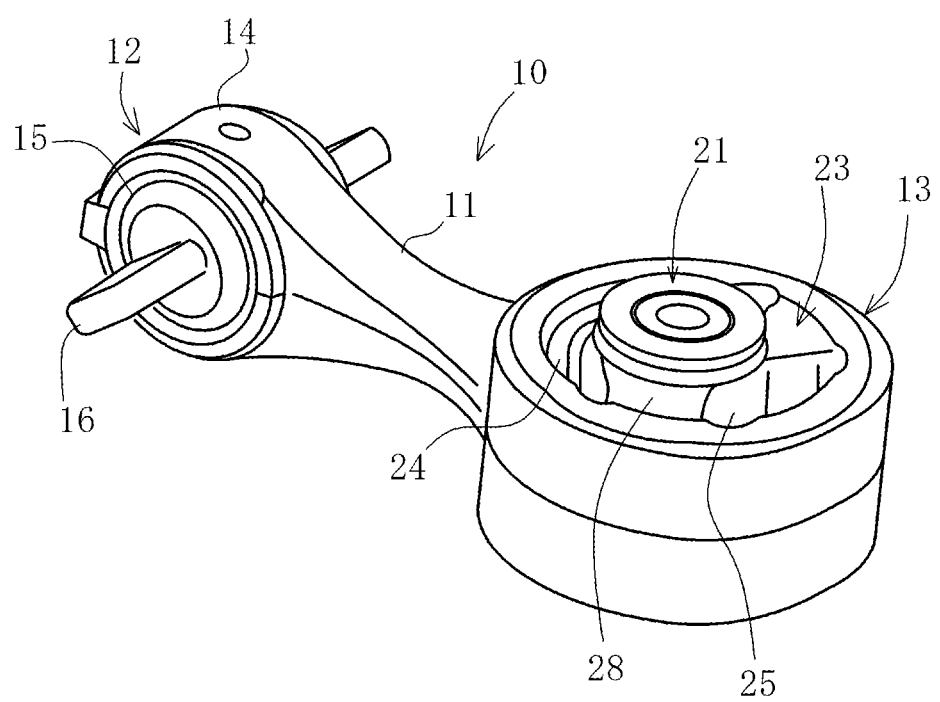
FIG. 1 is a perspective view of a torque rod in accordance with a first embodiment of the present invention.
Figure 2:
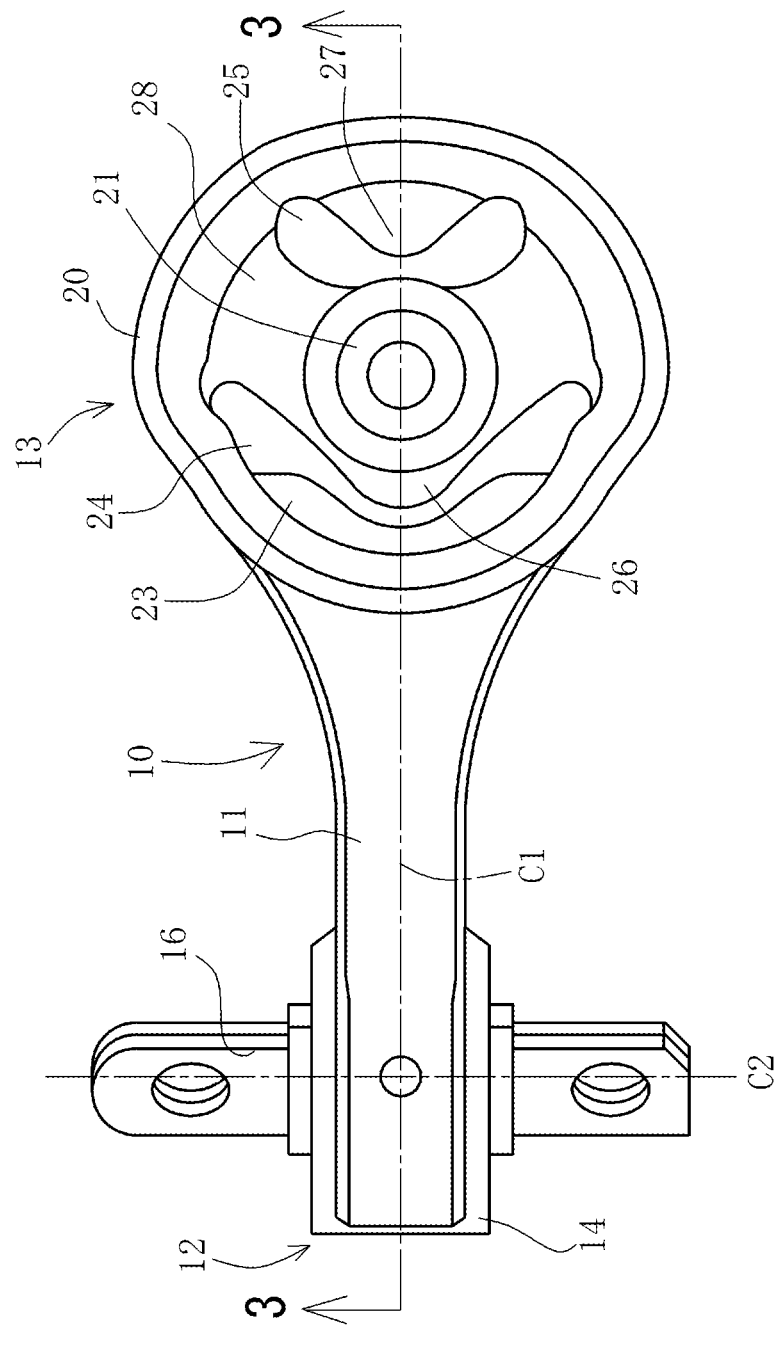
FIG. 2 is a plan view of the torque rod in accordance with the embodiment of the present invention.
Figure 3:
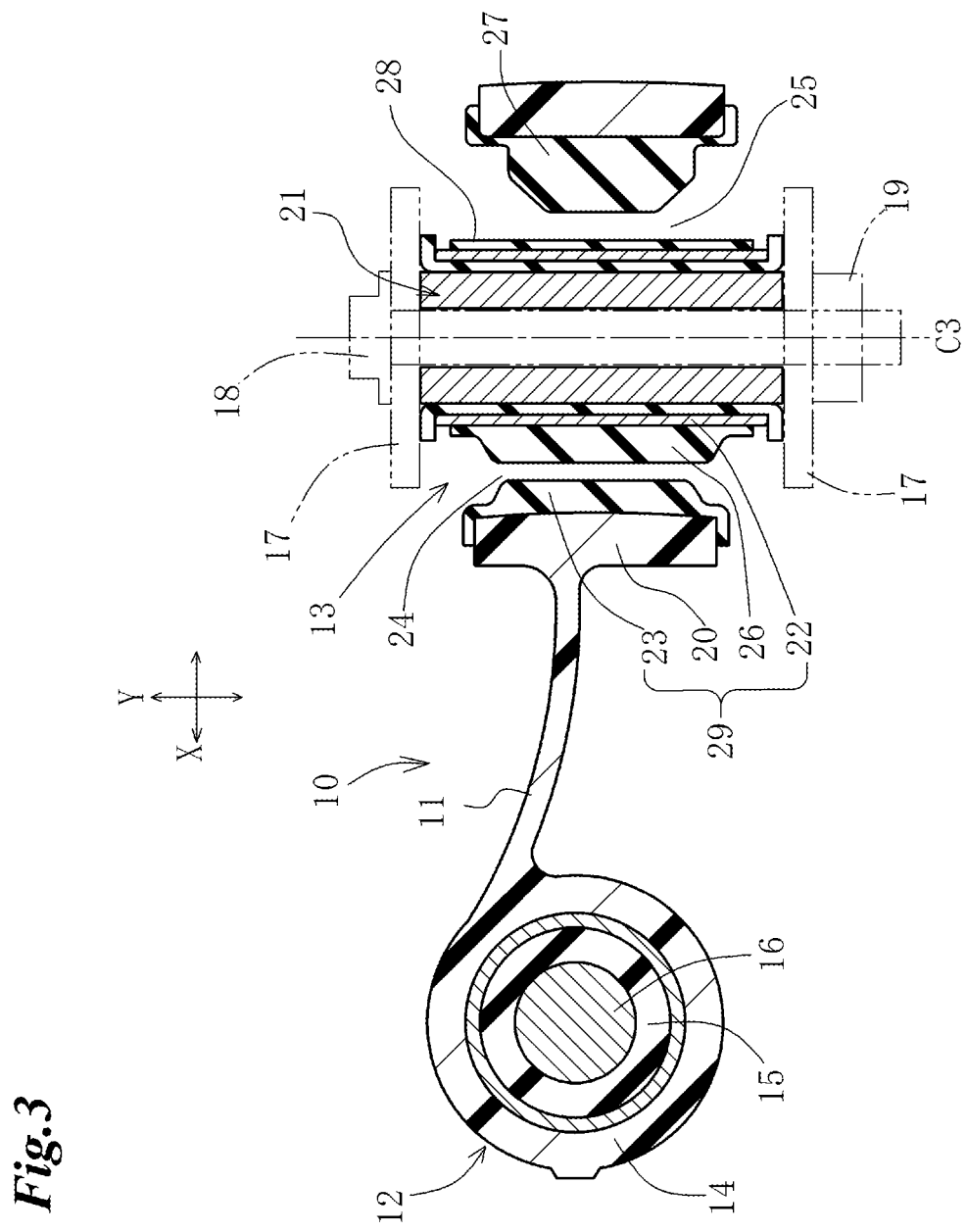
FIG. 3 is a cross sectional view taken on line 3-3 of FIG. 2.
Figure 4:
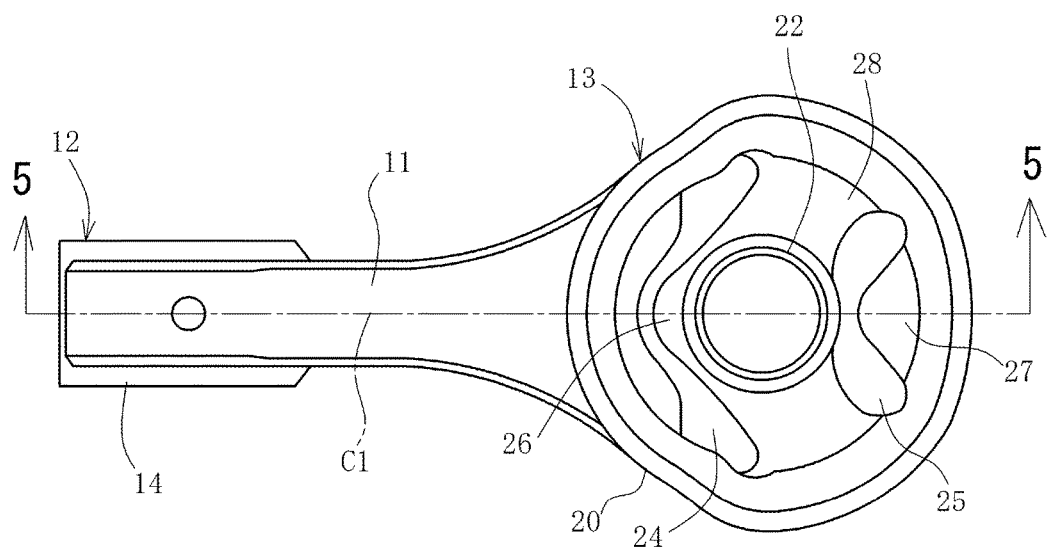
FIG. 4 is a view omitting an inner member from FIG. 2.
Figure 5:
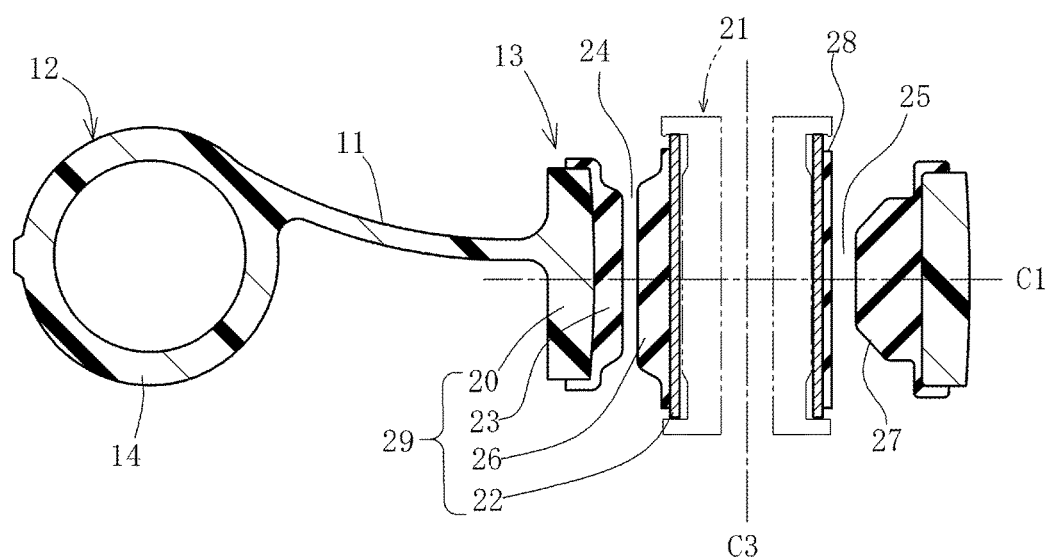
FIG. 5 is a cross sectional view taken on line 5-5 of FIG. 4.
Figure 6:
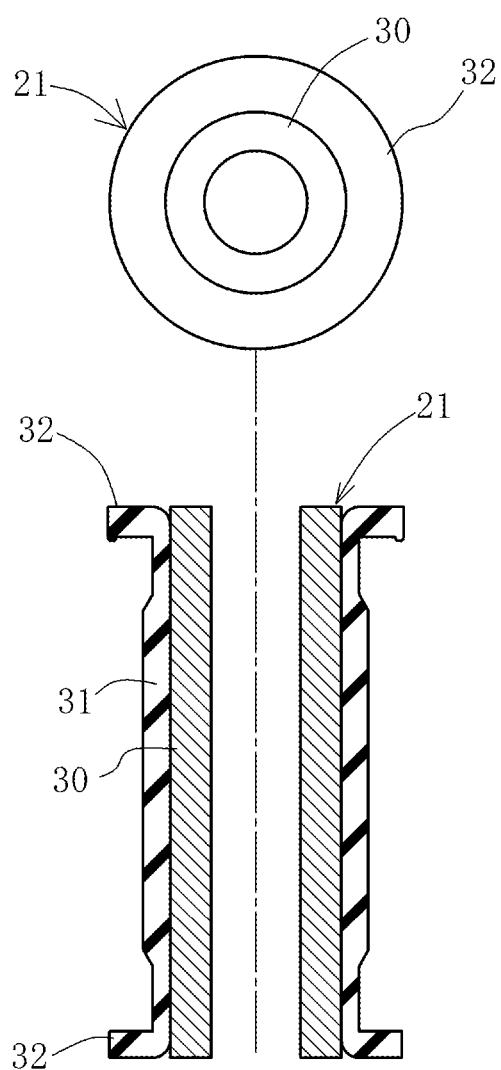
FIG. 6 is a cross sectional view of the inner member taken in an axial direction thereof, accompanied with a side view as seen in the axial direction thereof.
Figure 7:
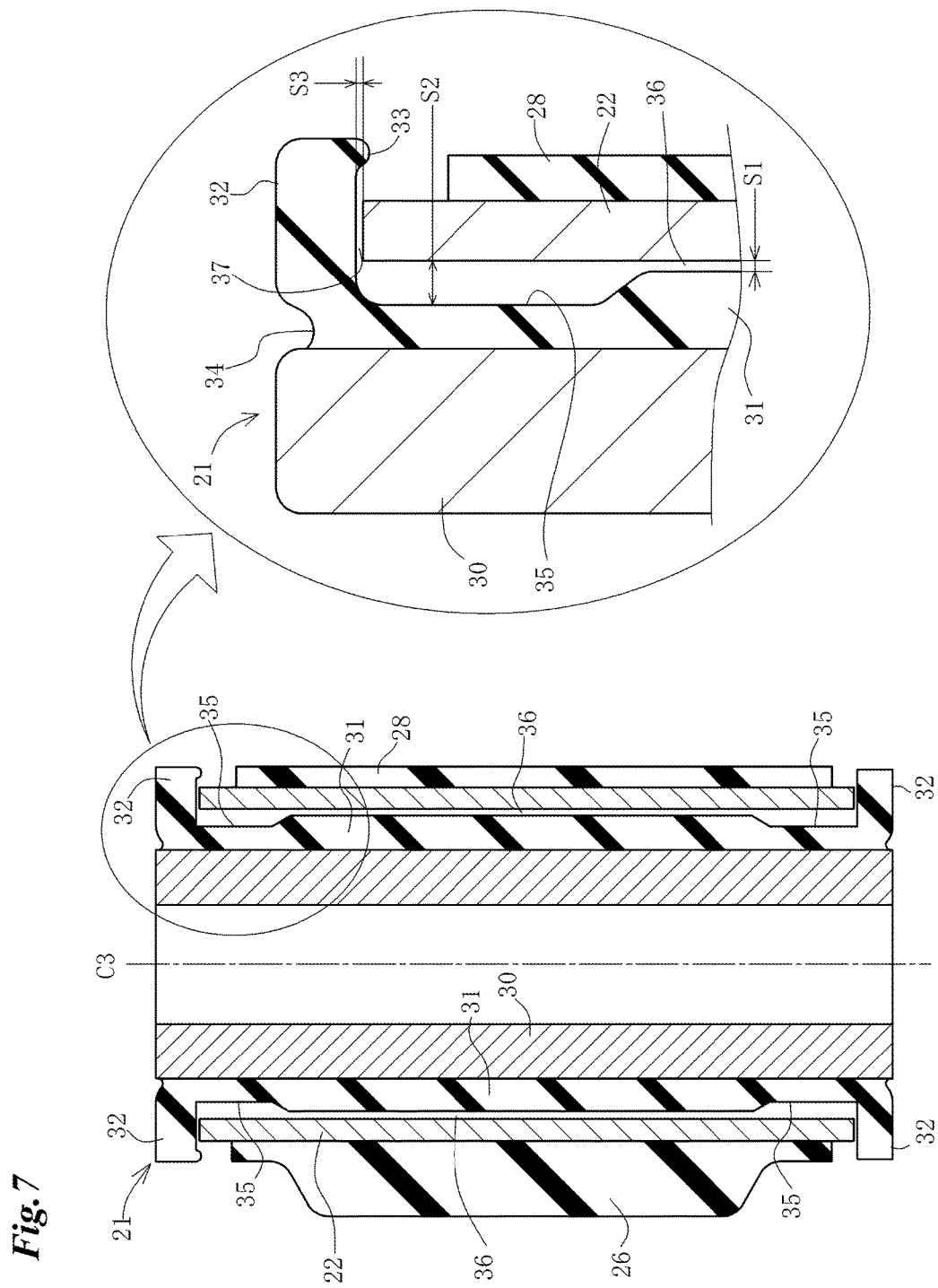
FIG. 7 is an enlarged cross sectional view of FIG. 3 with respect to the inner member and a portion of a neighboring part thereof.

FIG. 1 is a perspective view of a torque rod. FIG. 2 is a plan view of the torque rod. FIG. 3 is a cross sectional view taken on line 3-3 of FIG. 2. FIG. 4 is a view omitting an inner member from FIG. 2. FIG. 5 is a cross sectional view taken on line 5-5 of FIG. 4. FIG. 6 is a cross sectional view in an axial direction of the inner member accompanied with a side view as seen in the axial direction thereof. FIG. 7 is an enlarged cross sectional view of FIG. 3 with respect to the inner member and a portion of a neighboring part thereof.

This torque rod 10 is provided with a small ring part 12 and a large ring part 13 at each end of a rod 11. The small ring part 12 includes a small ring 14 which is integrally formed with the rod 11, and a rubber bushing 15 which is press fitted into the inside of the small ring 14. A stay 16 provided in a center portion of the rubber bushing 15 is mounted on an engine (not shown in the drawing) by a bolt. The engine is a vibration source.

A torque rod center axis C1 which is a center axis in a longitudinal direction of the rod 11 lies at right angles to a center axis C2 of the small ring part 12 and to a center axis C3 (FIG. 3) of the large ring part 13 respectively, and passes through an axial center of the large ring part 13. The center axis C2 of the small ring part 12 and the center axis C3 of the large ring part 13 are shifted 90 degrees from each other.

However, the small ring part 12 and the large ring part 13 may be arranged to face the same direction in such a manner that each of axes extends in parallel.

By the way, with respect to the center axis C1 in the longitudinal direction of FIG. 2, the side of the small ring part 12 is referred to as a forward side, while the side of the large ring part 13 is referred to as a rearward side. A direction extending in parallel with the center axis C2 of FIG. 2 is referred to as right and left direction. In addition, a forward and rearward direction is referred to as an X direction, and a direction extending in parallel with the center axis 13 is referred to as a Y direction. The X direction is also an inputting direction of main vibration. The Y direction is also the direction of a mounting shaft.

The large ring part 13 includes an outer frame section 20 of a large diameter ring formed integral with the rod 11, an inner member 21 provided approximately in a center thereof, an intermediate ring 22 surrounding the inner member 21 and being arranged between the outer frame section 20 and the inner member 21, and an elastic vibration isolating main body 23 elastically connecting the intermediate ring 22 and the outer frame section 20. The elastic vibration isolating main body 23 is a main spring section forming a main active part of spring which functions as a vibration isolating member of the large ring part 13 provided between the outer frame section 20 and the intermediate ring 22. The elastic vibration isolating main body 23 is made of rubber in this embodiment and integrally bonds through vulcanization the outer frame section 20 and the inner member 21.

As shown in FIG. 3, a stay 17 which extends from a vehicle body (not shown in the drawing) side as a vibration transmitted side is placed on each end in the axial direction of the inner member 21. A bolt 18 is inserted into a through hole provided in the center of the inner member 21 and fixed with a distal end thereof being fastened by a nut 19.

When the vibration of the engine is transmitted from the small ring part 12 to the large ring part 13 and the large ring part 13 vibrates in the axial direction of the inner member 21, rigid body resonance is created at a predetermined vibration (about 100~200 Hz, for instance) in the Y direction.

By the way, the axial direction of the inner member 21 is the direction parallel to the center axis C3 and also is the direction of a mounting axis in the present invention. In addition, the following explanation will be made in relation to the large ring part 13. Therefore, the axial direction shall indicate the axial direction of the inner member 21 as long as there is no express notice.

A central section of the elastic vibration isolating main body 23 is separated by bored holes 24, 25 from the outer frame section 20 on front and rear sides of the inner member 21 on the center axis C1. A portion between the bored holes 24, 25 forms a rubber foot section 28. Each of the bored holes 24, 25 projects most forwardly at a portion located on the central axis C1, and stoppers 26, 27 corresponding to each of the projecting portions are formed on the side of the outer frame section 20. The stoppers 26, 27 are made of the same rubber as the elastic vibration isolating main body 23 and formed at the same time as the elastic vibration isolating main body 23.

In addition, the outer frame section 20 and the intermediate ring 22 form an outer structure section 29 which has been integrally combined in advance by the elastic vibration isolating main body 23, separately from the inner member 21.

The rubber foot section 28 holds the inner member 21 therein and is formed in substantially a V-shape. The rubber foot section 28 is configured to absorb mainly the vibration of the engine in the X direction along the direction of the center axis C1. Then, the spring is varied in two steps of a soft spring condition where the bored holes 24, 25 are first crushed and deformed and of a hard spring condition where the bored holes 24, 25 come in contact with the stoppers 26, 27 after having been crushed.

Next, the inner member 21 will be explained in detail. FIG. 6 is a cross sectional view in an axial direction of the inner member 21 accompanied with a side view of a cylindrical section 30 and a retainer flange 32 as seen in the axial direction thereof. FIG. 7 is an enlarged cross sectional view of FIG. 3 with respect to the inner member and a portion of a neighboring part thereof including the intermediate ring 22, the stopper 26, the rubber foot section 28, etc. FIG. 7 also is an enlarged cross sectional view of a part including the retainer flange 32.

As shown in FIGS. 6 and 7, the inner member 21 includes the cylindrical section 30 made of a rigid body such as metal or the like, and an outer circumference covering section 31 covering an outer circumference of the cylindrical section 30 and integrally formed therewith. Each end in the axial direction of the outer circumference covering section 31 is formed with the retainer flange 32 which protrudes in a flange shape outwardly in the radial direction of the cylindrical section 30. This retainer flange 32 is of a circular shape when viewed in the axial direction, and is formed integral with the outer circumference covering section 31. The retainer flange 32 extends longer than the intermediate ring 22 in a radially outward direction. By the way, this retainer flange 32 may be formed separately from the outer circumference covering section 31.

As shown in the enlarged part of FIG. 7, a distal end of the retainer flange 32 projects slightly inwardly in the axial direction and is formed with a projecting edge portion 33 which overlaps with an axial end of the intermediate ring 22 in the radial direction. Moreover, an outer surface in the axial direction of a basal portion of the retainer flange 32 is formed with a bending groove 34 recessed inwardly in the axial direction.

Further, a small diameter recess 35 is provided on an outer circumferential part of each end in the axial direction of the outer circumference covering section 31. The length in the axial direction of this small diameter recess 35 is slightly longer than the retainer flange 32.

As shown in FIG. 7 and the enlarged part thereof, the intermediate ring 22 is a cylindrical member made of a rigid body such as metal or the like. Between an inner circumferential surface of the intermediate ring 22 and an outer circumferential surface of the outer circumference covering section 31 provided for covering an outer circumferential surface of the cylindrical section 30, there is formed an inner clearance 36 which has a predetermined space S1 and which surrounds the inner member 21.

This inner clearance 36 extends around full circumferences and over full lengths of the outer circumference covering section 31 and the intermediate ring 22 and is formed in the shape of a ring. The inner clearance 36 separates the outer circumference covering section 31 from the intermediate ring 22 and allows the inner member 21 to be moved relative to the intermediate ring 22 so as not to produce a sliding resistance.

As hereinafter described, the sliding resistance having no influence on the spring in the Y direction is permissible, and the outer circumference covering section 31 and the intermediate ring 22 are able to contact each other at a minute portion. In addition, the space S1 of the inner clearance 36 is freely adjustable for setting the resonance frequency of the rigid body resonance at the predetermined value.

In a region of the small diameter recess 35, a gap having a larger space S2 is formed between the outer circumference covering section 31 and the intermediate ring 22. In addition, a slight gap 37 having a space S3 is formed between the axial end of intermediate ring 22 and the inner surface of the retainer flange 32. This gap 37 is useful for preventing the dust and water from entering the inner clearance 36. It is configured to ensure amplitude of estimated vibration in order to prevent the occurrence of the sliding resistance in the axial direction in the case of being narrowed excessively.

Figure 8:
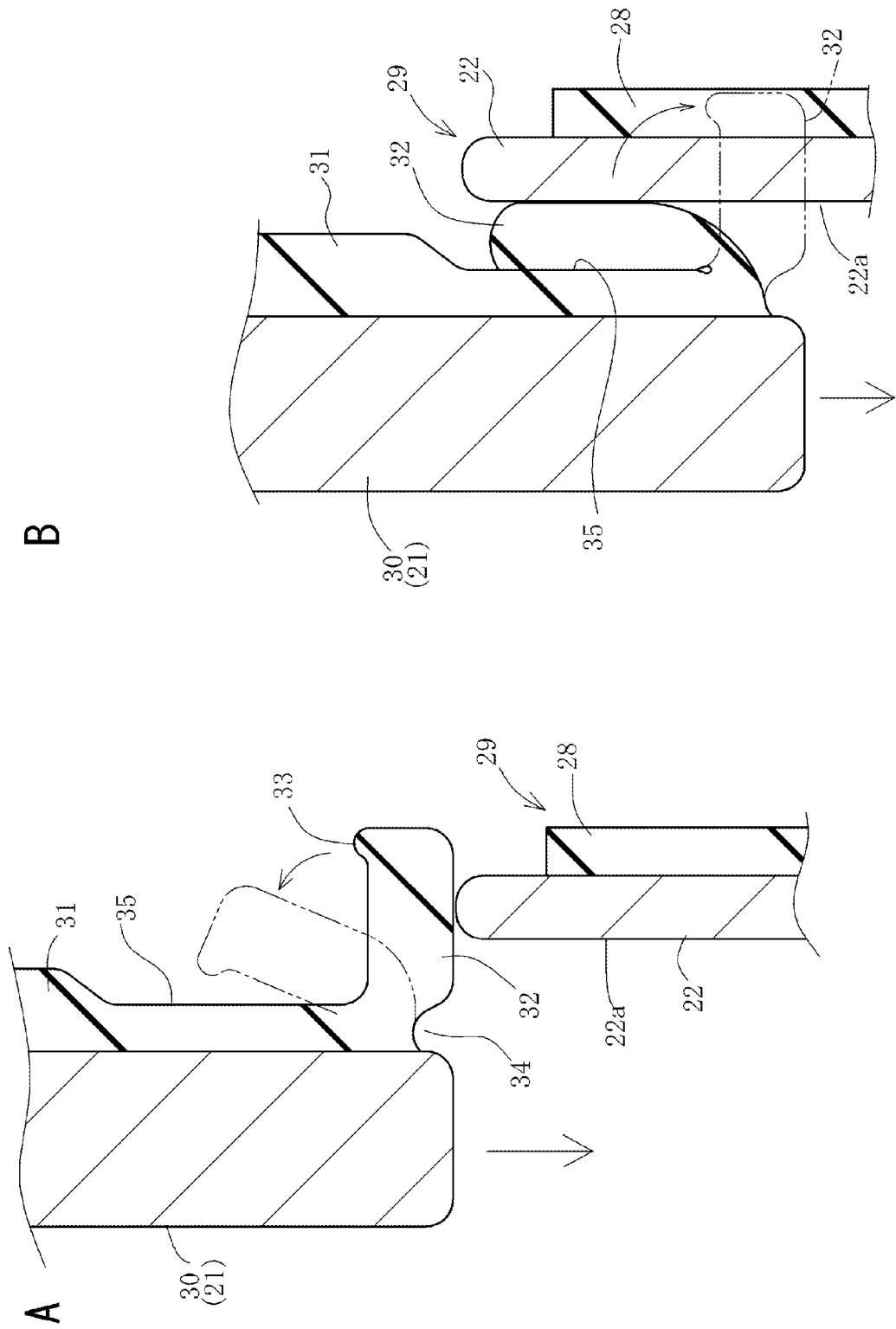
FIG. 8 is a view of assistance in explaining an installation of the inner member relative to an outer structure section.

FIG. 8 is a view of assistance in explaining an installation of the inner member 21 in the inside of the intermediate ring 22 of the outer structure section 29. First, as shown in FIG. 8-A, when the inner member 21 is pressed into a through hole 22a of the intermediate ring 22, the retainer flange 32 comes into contact with the axial end of the intermediate ring 22 and is bent down into the small diameter recess 35.

Therefore, as shown in FIG. 8-B, when the inner member 21 is pressed further into the through hole 22a, the retainer flange 32 is folded back onto the small diameter recess 35 and is capable of passing through the through hole 22a by being slightly compressed and deformed.

Accordingly, although the inner member 21 is formed with the retainer flange 32, it is able to be inserted into the through hole 22a and to pass through it to the other side. When the inner member 21 reaches the other side, the retainer flange 32 returns to the initial position of a flange shape by its own elasticity, as shown by a phantom line in FIG. 8-B. At that time, the bending groove 34 functions to facilitate the bend of the retainer flange 32.

Next, the operation will be explained.

When the main vibration is inputted from the engine to the small ring part 12 in the condition where the torque rod 10 is mounted on the engine and the vehicle body, it is transmitted through the rod 11 to the large ring part 13, and the vibration in the forward and rearward direction (the X direction) is absorbed by the elastic deformation of the rubber foot section 28. At that time, since the rubber foot section 28 is formed integral with the intermediate ring 22, the spring in the forward and rearward direction can be enlarged enough to be required, even if the rubber foot section 28 is separated from the inner member 21 by the inner clearance 36.

On the other hand, with respect to the vibration in the Y direction, since the intermediate ring 22 and the inner member 21 are separated by the inner clearance 36, the intermediate ring 22 and the inner member 21 are comparatively freely moved relative to each other, whereby the spring in the Y direction is weakened so that the vibration transmission to the inner member 21 is decreased.

Figure 20:
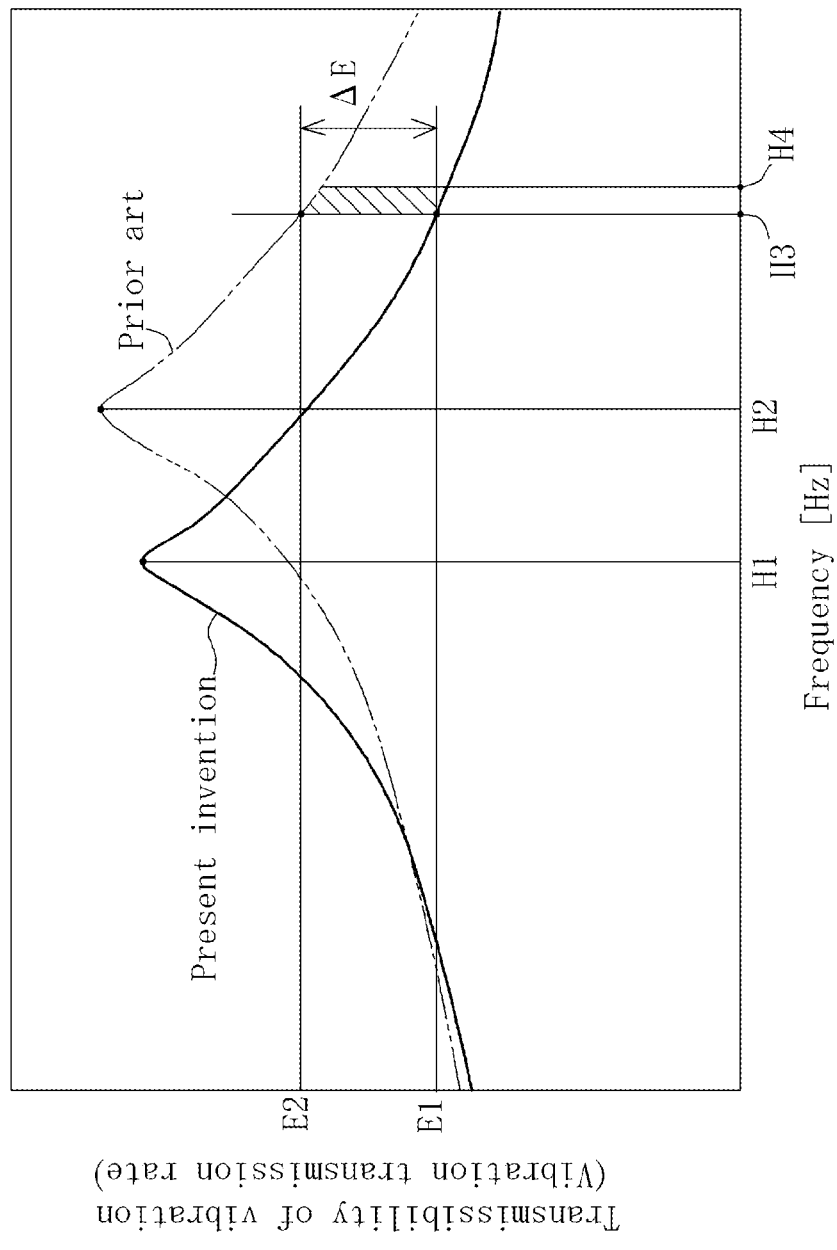
FIG. 20 is a graph indicating a relationship between resonance frequency and vibration transmission efficiency with respect to rigid body resonance.

Therefore, the resonance frequency of the rigid body resonance in the Y direction is lowered. As a result, as shown by a solid line in FIG. 20, a peak value of the rigid body resonance becomes H1 which is lower than the prior art, and the curve of the rigid body resonance as a whole is moved to the left side in the drawing, namely, to the low frequency side in relation to the prior art. Accordingly, the transmissibility of vibration at the frequency H3 to be isolated becomes the lower value E1, and there is caused a vibration cut-off effect of a difference $\Delta E$ in comparison with the transmissibility E2 of vibration of the prior art, so that a remarkable vibration isolating effect as shown by hatching can be obtained in a frequency range of H3 to H4 to be isolated.

In addition, when the weakness of the spring in the Y direction is adjusted, the resonance frequency is varied in accordance with the adjustment. Therefore, by adjusting the spring in the Y direction, the resonance frequency of the rigid body resonance is freely controllable. Therefore, the resonance frequency of the rigid body resonance can be freely controlled in such a manner that the transmissibility of vibration in the frequency range to be isolated becomes a desired value, whereby the rigid body resonance in the direction of a mounting shaft (in the axial direction of the inner member 21) can be effectively isolated.

Moreover, since the outer frame section 20 and the elastic vibration isolating main body 23 are previously integrally combined into the outer structure section 29, the main vibration input in the direction orthogonal to the mounting shaft (in the X direction) can be absorbed by the outer structure section 29 and the inner member 21, whereby no influence is exerted upon the spring in the inputting direction of the main vibration.

Further, the intermediate ring 22 which surrounds the inner member 21 is located between the outer frame section 20 and the inner member 21. This intermediate ring 22 and the outer frame section 20 are integrally combined by the elastic vibration isolating main body 23 of proper elastic body such as rubber or the like into the outer structure section 29. Therefore, even if the inner member 21 is separated, the spring in the inputting direction of the main vibration can be maintained sufficiently by the outer structure section 29 only.

Furthermore, the elastic vibration isolating main body 23 is formed with the bored holes 24, 25, and the rubber foot section 28 is formed between these bored holes 24 and 25. Therefore, it is possible to obtain a suitable spring characteristic that allows the spring in the main vibration inputting direction to be varied in two steps. In addition, with provision of the intermediate ring 22, even if such bored holes are provided, it is possible to realize a predetermined spring characteristic.

Further, as shown in FIG. 7, the intermediate ring 22 is opposed to the cylindrical section 30 through the outer circumference covering section 31. Therefore, even if the intermediate ring 22 is moved in the main vibration inputting direction and comes into contact with the inner member 21, it contacts the outer circumference covering section 31 of the elastic body, whereby it is possible to prevent occurrence of a sharp noise by contact between metals.

Further, the retainer flange 32 is configured to cover the axial end of the intermediate ring 22. Therefore, although the inner clearance 36 is provided between the inner member 21 and the intermediate ring 22, the penetration of the foreign matter such as water, dust or the like into the inner clearance 36 can be reduced, and the occurrence of the sliding resistance at the time of movement in the axial direction can be prevented.

In addition, when the intermediate ring 22 comes into contact with the retainer flange 32 due to large amplitude vibration of more than the predetermined level, the retainer flange 32 can be elastically deformed so as to receive the intermediate ring 22.

Namely, the retainer flange 32 allows the inner member 21 and the intermediate ring 22 to be moved at the predetermined stroke relative to each other in the axial direction, and functions as a side stopper for preventing more movement than the predetermined stroke.

Moreover, this side stopper is not strong so much since the retainer flange 32 is made of an elastic member, and functions as a simple retainer which prevents the inner member 21 from slipping off when handling the vibration isolating device before mounting it on the vehicle body or the like. Like this, with provision of the retainer, the inner member 21 and the outer structure section 29 are handled together in a combined state, whereby it is convenient for handling.

Further, since the retainer flange 32 is the elastic member, the occurrence of the noise can be prevented when the axial end of the intermediate ring 22 has contacted the retainer flange 32. In addition, the retainer flange 32 is formed integral with the outer circumference covering section 31, so that the formation of the retainer flange 32 can be easily carried out.

Further, the small diameter recess 35 for folding and accommodating the retainer flange 32 is provided on the end in the axial direction of the outer circumference covering section 31. Therefore, when the inner member 21 is inserted into the intermediate ring 22, the retainer flange 32 which comes into contact with the axial end of the intermediate ring 22 can be folded onto the small diameter recess 35 to be accommodated therein, whereby the inner member 21 can be easily inserted.

Figure 9:
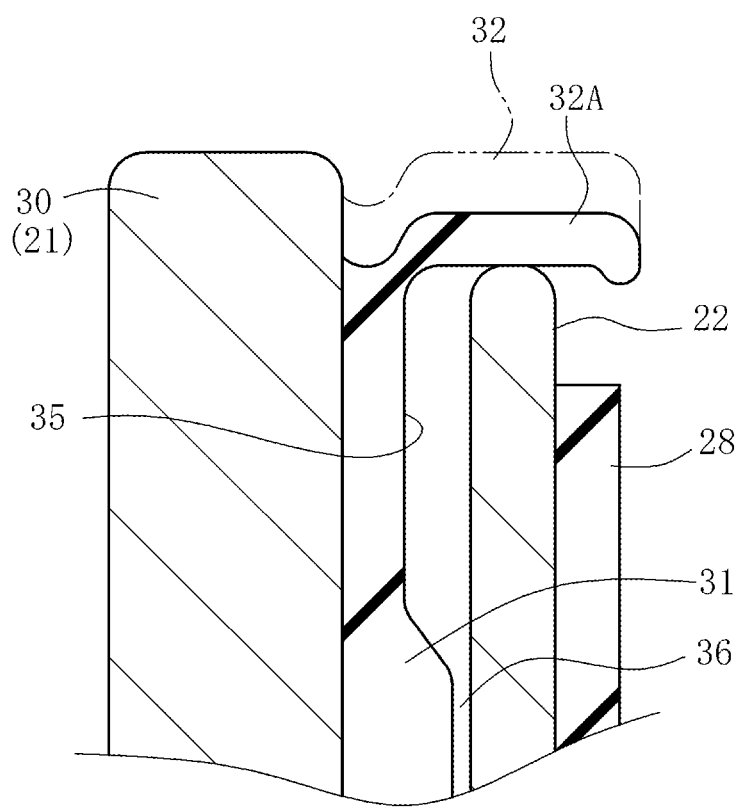
FIG. 9 is a view showing modified examples of the inner member.

FIG. 9 is a modified example of a part of the outer circumference covering section 31 as shown in FIG. 7. A retainer flange 32A is thinned, and the axial end of the intermediate ring 22 comes into contact with an inner surface of the retainer flange 32A, whereby there is no gap (the gap 37 in FIG. 7) in this region.

With this construction, the retainer flange 32A is capable of surely preventing the dust and water from entering into the inner clearance 36. In addition, since the retainer flange 32A is made thinner and easily deformed almost without any resistance when the intermediate ring 22 is moved in the axial direction, whereby it is possible to practically disregard the influence upon the spring in the Y direction.

Figure 10:
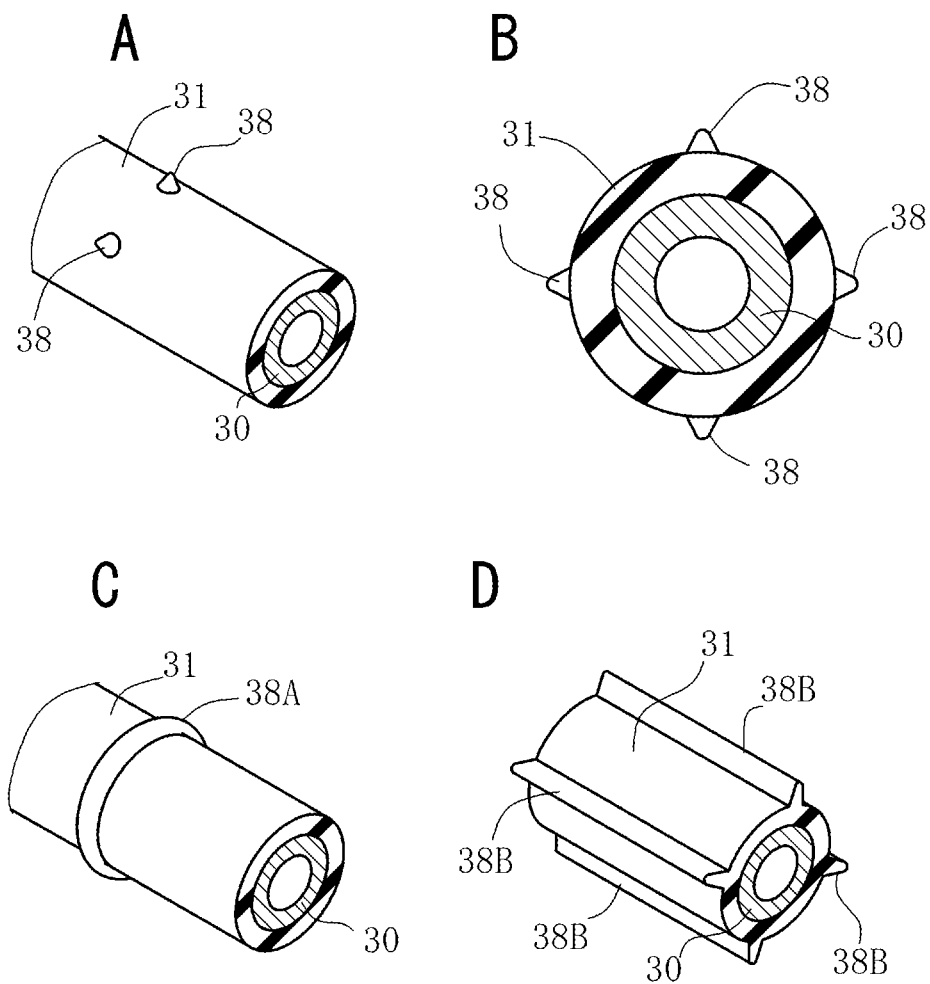
FIG. 10 is a view showing a modified example of an outer circumference covering section.
Figure 11:
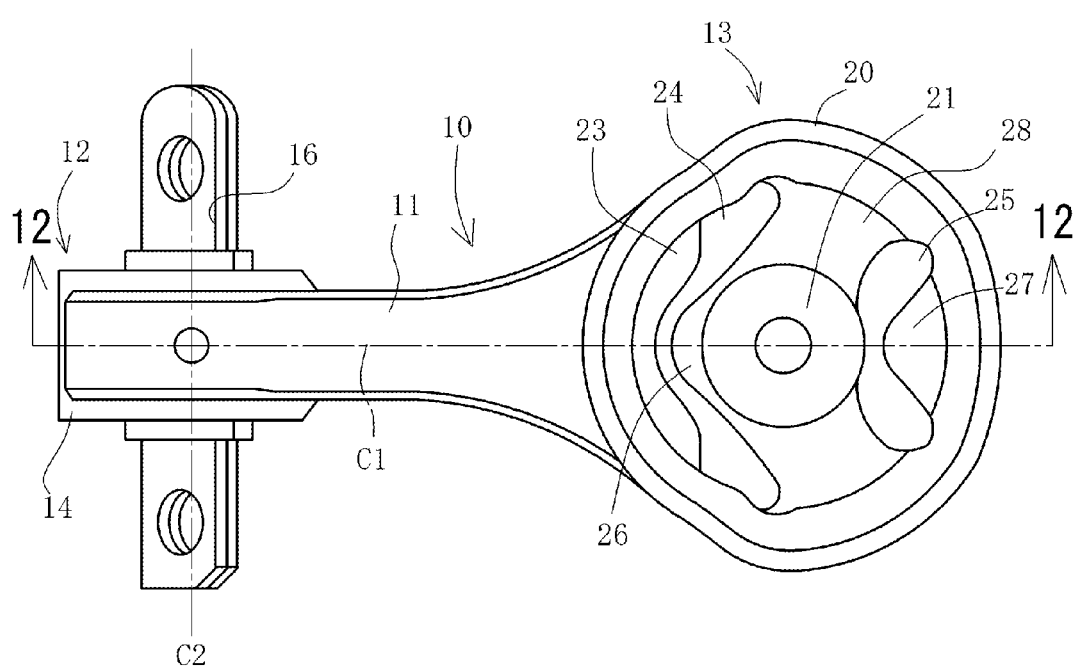
FIG. 11 is a plan view in accordance with a second embodiment.
Figure 12:
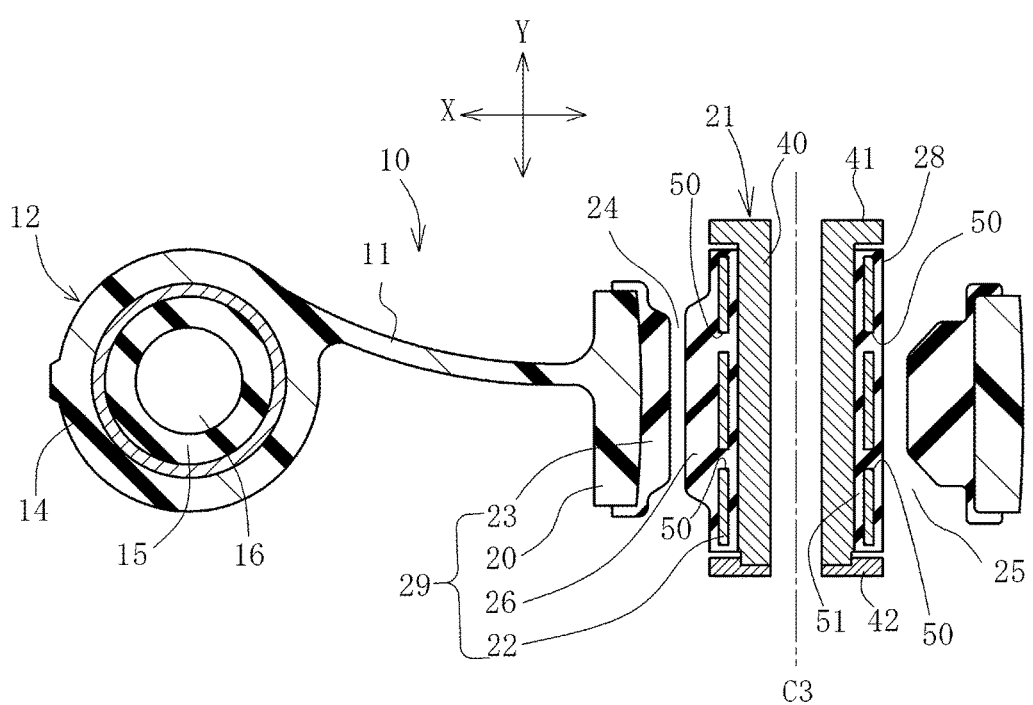
FIG. 12 is a cross sectional view taken on line 12-12 of FIG. 11.
Figure 13:
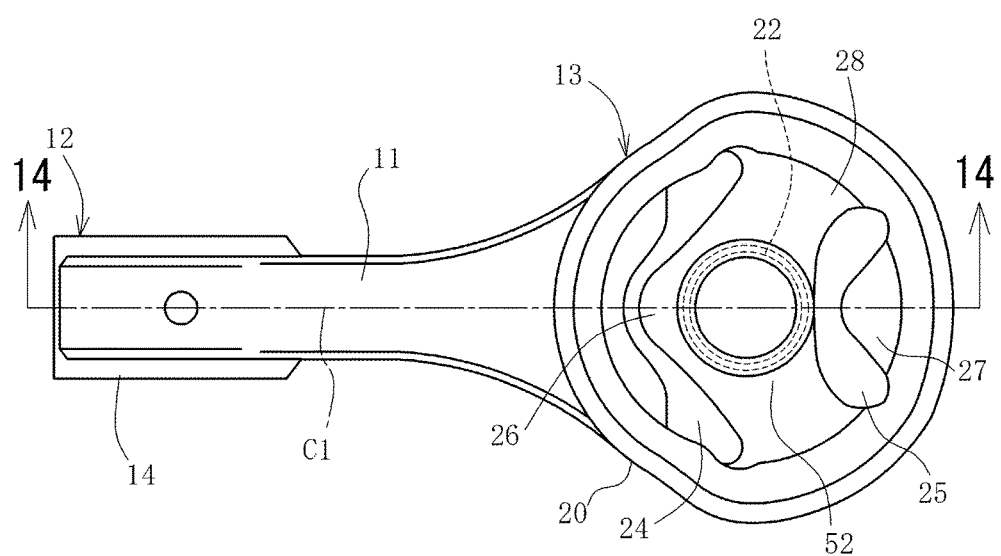
FIG. 13 is a view omitting the inner member from FIG. 11.
Figure 14:
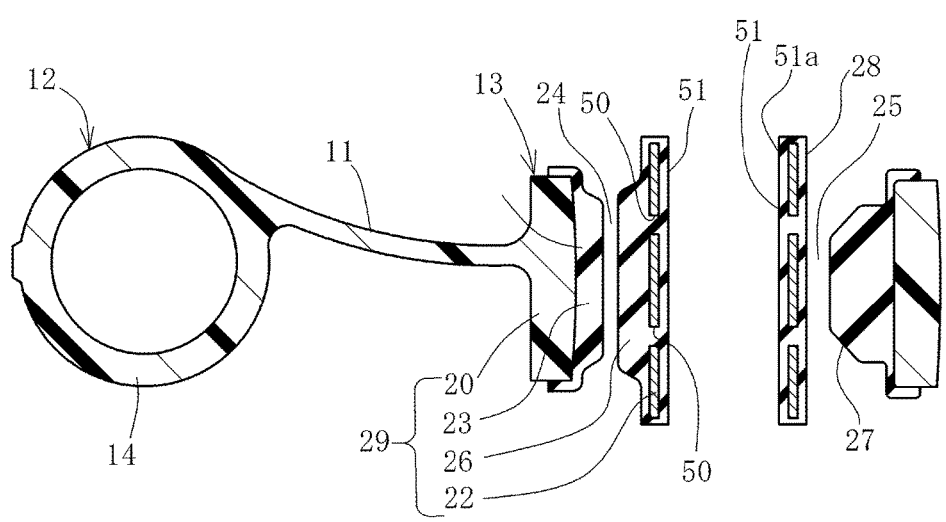
FIG. 14 is a cross sectional view taken on line 14-14 of FIG. 13.

FIG. 10 is another modified example of the outer circumference covering section 31. A shown in FIGS. 10-A and 10-B, the outer circumference covering section 31 is integrally provided at the surface thereof with centering projections 38 which are formed of pointed small projections. The centering projections 38 are in contact with the intermediate ring 22. The centering projections 38 are small projections having a projecting length substantially corresponding to the inner clearance 36. A plurality of centering projections 38 are provided at predetermined spaced intervals in the circumferential direction of the outer circumference covering section 31.

With this construction, when the inner member 21 is inserted into the intermediate ring 22, the centering is carried out by the centering projections 38, whereby the assembling operation can be facilitated.

Further, although the centering projections 38 are in contact with the intermediate ring 22, a contact surface is very small, so that the sliding resistance at the time of movement in the axial direction of the intermediate ring 22 can hardly be caused.

By the way, FIG. 10-A is a perspective view showing a part of the outer circumference covering section 31, and FIG. 10-B is a cross sectional view in the axial direction thereof. FIGS. 10-C and 10-D are variations of the centering projection 38, showing a part corresponding to FIG. 10-A, respectively.

In FIG. 10-C, the outer circumference covering section 31 is formed with an annular projection 38A around the circumference in the circumferential direction thereof. In FIG. 10-D, linear projection 38B which extend linearly in the axial direction are formed integral with the outer circumference covering section 31. The annular projection 38A and the linear projections 38B function as a centering projection, respectively. Like this, the centering also can be carried out in these types of projections, and the sliding resistance can hardly be caused.

By the way, the zero clearance construction that provides no clearance between the intermediate ring 22 and the retainer flange 32, and the centering construction of the inner member 21 may be provided separately. In addition, the centering projection 38 may be provided on the side of the intermediate ring 22.

Next, the second embodiment will be explained. By the way, in this embodiment, the inner member 21 is slightly modified in construction in relation to that of the former embodiment. Therefore, with respect to a construction identical to the former embodiment, like elements are given like reference characters and the overlapping explanation will be basically omitted. FIGS. 11 to 16 correspond to FIGS. 2 to 7 respectively.

In this embodiment, the inner member 21 is not covered with the outer circumference covering section 31 and includes a tube section 40 made of a rigid body such as metal or the like, an integral retainer flange 41 of flange shape which is integrally formed on one end in the axial direction of the tube section 40, and a separate retainer flange 42 to be attached to the other end of the tube section 40.

Figure 15:
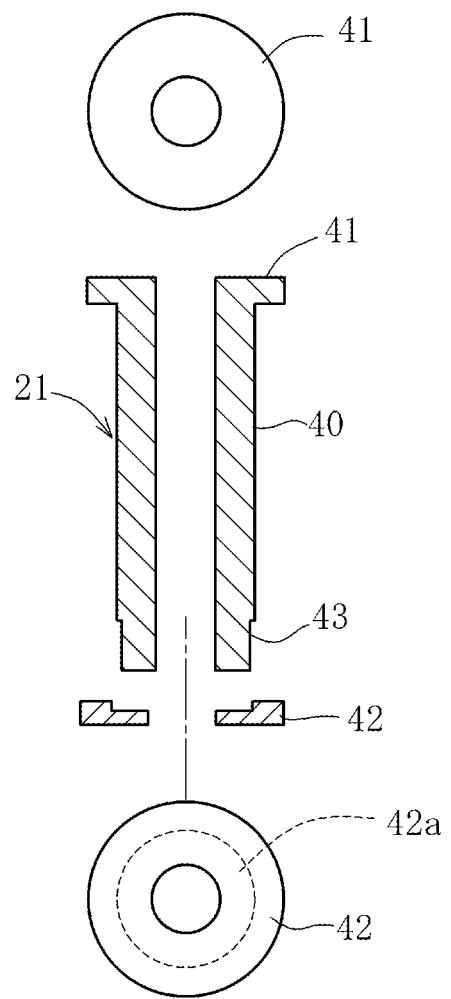
FIG. 15 is an axially exploded cross sectional view of the inner member accompanied with a side view of a retainer flange as seen in the axial direction thereof.
Figure 16:
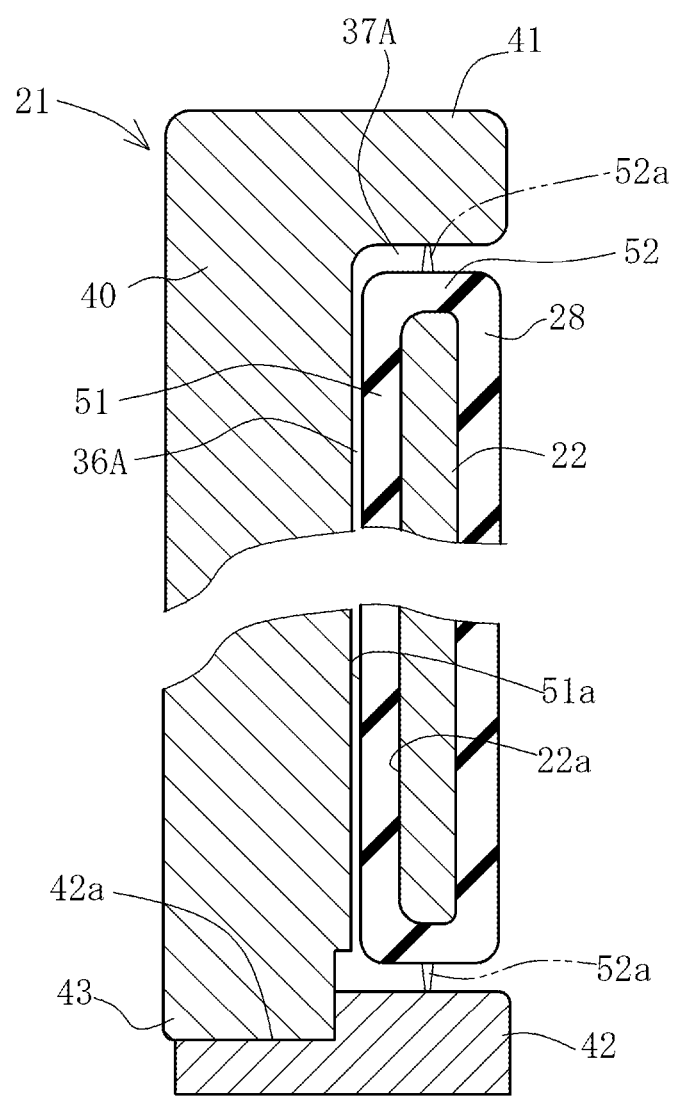
FIG. 16 is an enlarged cross sectional view showing the inner member and one side of the neighboring part thereof in FIG. 13.

As shown in FIGS. 15 and 16, an end of the tube section 40 located on an opposite side of the integral retainer flange 41 is formed with a small diameter portion 43 onto which the separate retainer flange 42 is press fitted. The separate retainer flange 42 is formed in the shape of a washer and provided at the central side thereof with a recess portion 42a to be fitted onto a distal surface of the small diameter portion 43. The small diameter portion 43 is press fitted into the separate retainer flange 42 whereby the tube section 40 is integrally combined with the separate retainer flange 42. The separate retainer flange 42 may be attached to the tube section 40 by connecting means such as welding, caulking or the like.

The intermediate ring 22 is integrally embedded in the elastic vibration isolating main body 23. The intermediate ring 22 is formed with through bores 50 by which the integration between the intermediate ring 22 and the elastic vibration isolating main body 23 is reinforced. Moreover, a part of the elastic vibration isolating main body 23 forms an inner circumference covering section 51 which covers an inner circumference of the intermediate ring 22. A predetermined inner clearance 36A (FIG. 16) is formed between the inner circumference covering section 51 and an outer circumferential surface of the tube section 40. Namely, an inner diameter of the inner circumference covering section 51 is larger than an outer diameter of the tube section 40. In addition, each end in the axial direction of the intermediate ring 22 also is covered with an axial covering portion 52 from outside.

As shown in FIG. 16, the axial covering portion 52 is formed longer in the axial direction than the end of the intermediate ring 22.

In the condition where the separate retainer flange 42 is not attached to the inner member 21, the small diameter portion 43 of the inner member 21 is inserted into and passes through an axial hole 51a of the inner circumference covering section 51 which covers the inner circumference of the intermediate ring 22. Then, since the inner diameter of the inner circumference covering section 51 is larger than the outer diameter of the tube section 40, the tube section 40 is smoothly inserted into the axial hole 51a.

When the small diameter portion 43 passes through the axial hole 51a and projects from the other side of the axial hole 51a, the integral retainer flange 41 comes closer to the axial covering portion 52. At that time, a gap 37a is formed between the integral retainer flange 41 and the axial covering portion 52.

With this construction, the intermediate ring 22 becomes movable in the axial direction in relation to the inner member 21. Moreover, the excessive axial movement of the intermediate ring 22 is suppressed by the integral retainer flange 41 and the separate retainer flange 42 functioning as stable side stoppers. In addition, the integral retainer flange 41 and the separate retainer flange 42 function as retainers for preventing the inner member 21 from slipping off and being separated from the outer structure section 29.

Further, since the separate retainer flange 42 is formed separately from the tube section 40 and combined together later, the inner member 21 is easily assembled. Namely, the retainer flange is constituted by the integral retainer flange 41 which is formed integral with one end in the axial direction of the inner member 21 and the separate retainer flange 42 which is formed separately to be attached to the other end in the axial direction of the inner member 21. Therefore, in the condition where the separate retainer flange 42 is not attached to the inner member 21, the other end in the axial direction of the inner member 21 is inserted into and passes through the inside of the intermediate ring 22, and thereafter the separate retainer flange 42 is attached to the other end in the axial direction of the inner member 21. In this way, the assembling can be carried out.

Moreover, the integral retainer flange 41 on one side can be firmly formed integral with the one end in the axial direction of the inner member 21, whereby the attachment at the time of assembling is not required.

Further, since the intermediate ring 22 is provided with the inner circumference covering section 51, the intermediate ring 22 and the tube section 40 are prevented from direct contact between metals, whereby it is possible to suppress the occurrence of a sharp noise.

Further, with provision of the axial covering portion 52, the integral retainer flange 41 and the separate retainer flange 42 are not allowed to come into direct contact with the axial end of the intermediate ring 22, so that, even if there is the excessive deformation of the intermediate ring 22, the occurrence of shock and noise can be prevented.

In addition, with provision of the integral retainer flange 41 and the separate retainer flange 42, it is possible to prevent the foreign matter such as dust, water or the like from entering the inner clearance 36A. Similarly, since the intermediate ring 22 is embedded in the rubber foot section 28 and is not exposed, the intermediate ring 22 can be prevented from rust.

By the way, as shown in FIG. 9, the gap 37A may be zero clearance. In this case, as shown by a phantom line in FIG. 16, lips 52a project in the axial direction from the axial covering section 52 and come into close contact with the integral retainer flange 41 and the separate retainer flange 42, whereby the zero clearance can be easily realized and the inner member 21 and the intermediate ring 22 are allowed to be moved relative to each other in the axial direction. In addition, the centering configuration of FIG. 10 may be freely adopted.

Figure 17:
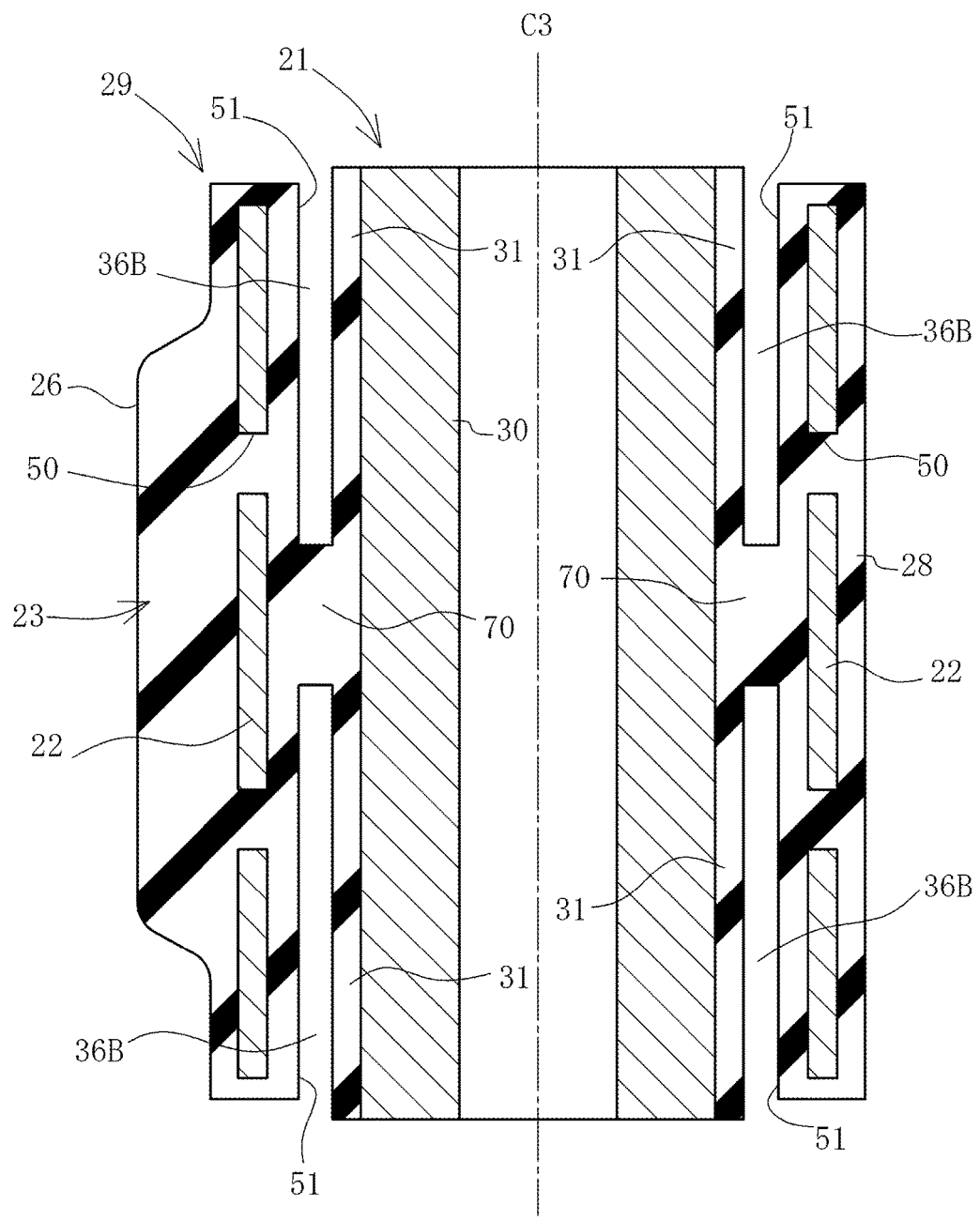
FIG. 17 is an enlarged cross sectional view showing the inner member and the neighboring part thereof in accordance with a third embodiment.

Next, the third embodiment will be explained with reference to FIG. 17. In this embodiment, instead of the retainer flange, another type of retainer flange is provided. FIG. 17 corresponds to a cross sectional view of the whole of inner member of FIG. 7. In addition, the intermediate ring 22 is embedded in the elastic vibration isolating main body 23 in a similar manner to that shown in FIG. 12.

In this embodiment, in a middle portion in the axial direction of the cylindrical section 30, a connecting section 70 is integrally formed between the outer circumference covering section 31 and the inner circumference covering section 51 of the elastic vibration isolating main body 23 on the side of the outer structure section 29. The outer structure section 29 and the inner member 21 are integrally combined by the connecting section 70. The outer circumference covering section 31 and the connecting section 70 are continuously formed integral with the elastic vibration isolating main body 23 of the outer structure section 29.

The connecting section 70 is formed in an annular shape which surrounds the circumference of the cylindrical section 30. On both sides in the axial direction of the connecting section 70 there are formed inner clearances 36B.

Each of the inner clearances 36B is formed of a ring-shaped groove which surrounds the cylindrical section 30 and located between the outer circumference covering section 31 and the inner circumference covering section 51. In addition, each of the inner clearances 36B is open outwardly in the axial direction and extends inwardly in the axial direction to the connecting section 70 servicing as a bottom thereof.

This inner clearances 36B are configured to control the resonance frequency of the rigid body resonance in the direction of the mounting shaft in a similar manner to the inner clearance 36 (36A) in each of the preceding embodiments. Namely, the inner member 21 and the outer structure section 29 are movable relative to each other in the axial direction parallel to a center axis C3, whereby it is possible to weaken the spring in the direction of the mounting shaft (in the Y direction) of the torque rod. Moreover, the adjustment of the spring in the direction of the mounting shaft is easily carried out by adjusting the depth (length) in the axial direction and the length in the circumferential direction.

In addition, the connecting section 70 is formed of an elastic member. Therefore, when the inner member 21 and the outer structure section 29 are moved relative to each other in the axial direction, the connecting section 70 slightly elastically deformed so as to function as a spring. Accordingly, although the spring in the axial direction (in the Y direction) is strengthened in accordance with an increase in spring of the connecting section 70 in comparison with that in each of the preceding embodiment, the spring of the connecting section 70 can be freely adjusted by varying the thickness, etc. of the connecting section 70, so that it is possible to practically disregard the influence upon the spring in the Y direction.

Accordingly, in the case where the spring when only the inner member 21 is displaced at a predetermined amount in the axial direction in the condition where the outer structure section 29 is fixed so as not to allow the rubber foot section 28 to be elastically deformed is considered to be a spring F1 of the connecting section 70, while the spring when only the rubber foot section 28 is displaced at a predetermined amount in the axial direction in the condition where the connecting section 70 is fixed so as not to be elastically deformed is considered to be a spring F2 of the rubber foot section 28, the spring F1 of the connecting section 70 is configured to be incomparably weaker than the spring F2 of the rubber foot section 28, namely, to be F2>>F1.

Further, the connecting section 70 is configured to maintain a mutual connection between the inner member 21 and the outer structure section 29 to prevent the slipping off of the inner member 21 even when the inner member 21 and the outer structure section 29 are moved relative to each other in the axial direction. Namely, the connecting section 70 functions as a retainer means in the present invention similar to the retainer flange 32 (41, 42).

Therefore, the retainer flanges are not provided in this embodiment. Although the retainer flanges are omitted, separate cover members similar to the retainer flanges may be freely provided in order to prevent the dust, water or the like from entering the inner clearances 36B.

In this way, when the outer structure section 29 and the inner member 21 are integrally combined by the connecting section 70, the whole are able to be formed at one time and there is no need to attach the inner member 21 to the outer structure section 29 in the following step in the manufacturing process, whereby the manufacturing is easily performed.

Figure 18:
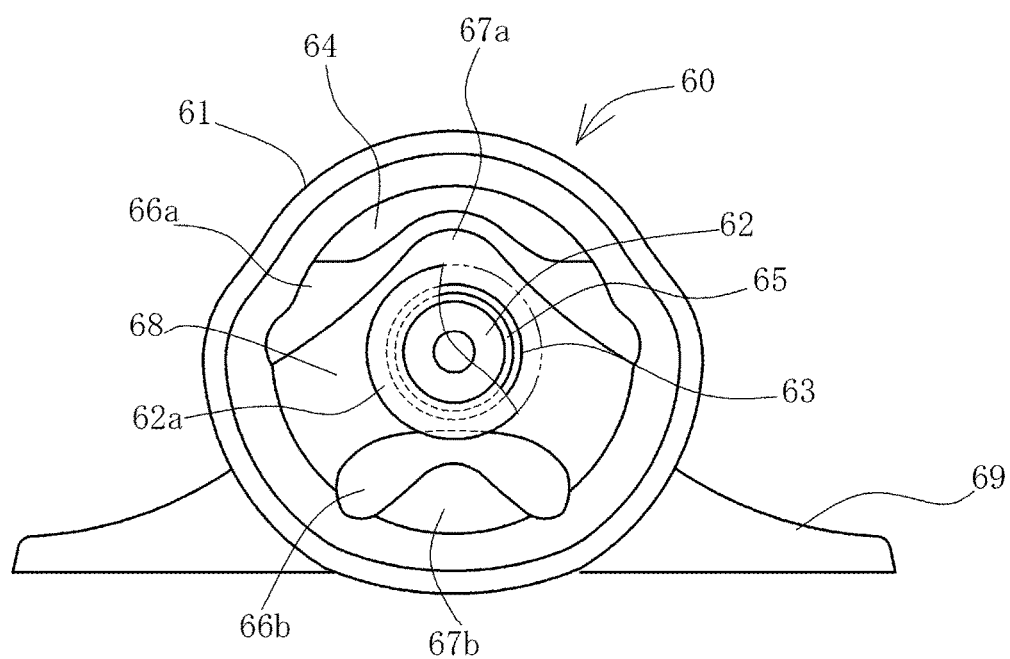
FIG. 18 is a front view of an engine mount in accordance with a fourth embodiment.

By the way, this device may be applied to various vibration isolating devices other than the torque rod. For instance, it is capable of being applied to a cylindrical engine mount 60 as shown in FIG. 18 as a fourth embodiment. This cylindrical engine mount 60 corresponds to only the large ring part 13 of FIG. 1 in the case of being formed as an independent mount, and includes an outer cylinder 61, an inner cylinder 62, an intermediate ring 63, an elastic member 64, an inner clearance 65, bored holes 66a, 66b, stoppers 67a, 67b and a rubber foot section 68.

In addition, a reference character 62a designates a retainer flange. The retainer flange 62a may be formed of an elastic member as shown in FIGS. 7 and 9 or formed of a rigid member as shown in FIG. 15.

These are the same as the outer frame section 20, the inner member 21, the intermediate ring 22, the elastic vibration isolating main body 23, the bored holes 24, 25, the stoppers 26, 27 and the rubber foot section 28. An inner clearance 65 corresponding to the inner clearance 36 is provided between the intermediate ring 63 and the inner cylinder 62.

With this construction, effects similar to the first and second embodiments can be obtained with respect to the rigid body resonance which is caused by the vibration in the axial direction in a vehicle body side joint part of the inner cylinder 62. As a matter of course the constructions in the first and second embodiment can be applicable to this embodiment.

Figure 19:
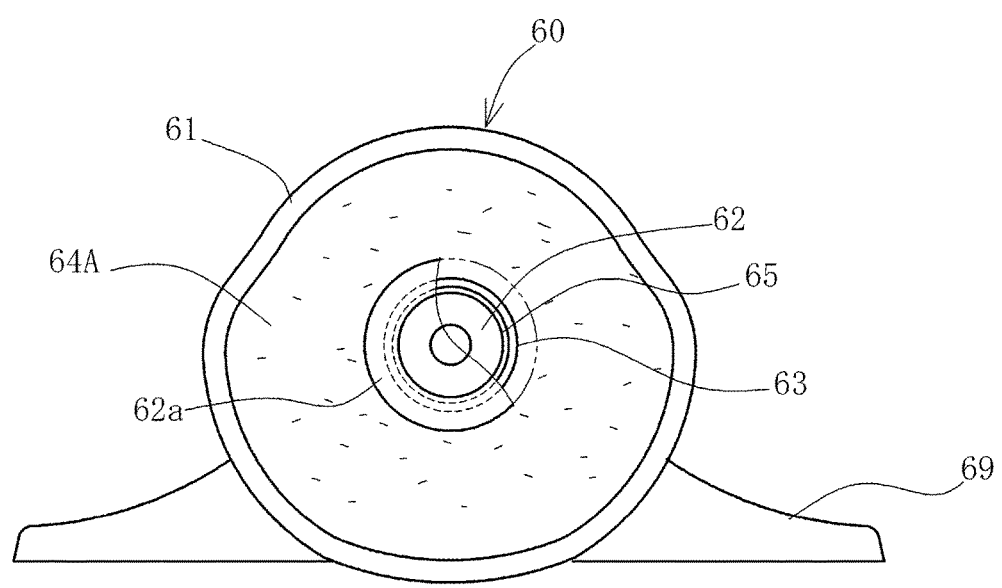
FIG. 19 is a view showing a modified example of FIG. 18.

FIG. 19 shows a modified form of FIG. 18. The bored holes 66a, 66b in FIG. 18 are not provided, and an elastic member 64A between the outer cylinder 61 and the intermediate ring 63 is formed in the shape of a cylindrical rubber bushing. In this case, although the spring of the elastic member 64 is not varied in two steps, the effects for preventing or decreasing the rigid body resonance due to the vibration in the axial direction can be produced. In addition, this construction may be applied to the large ring part 13 of the first and second embodiments.

By the way, the present invention is not limited to the above embodiments, and various changes and modifications may be made in the invention without departing from the spirit and scope thereof. For instance, the clearance for controlling the resonance frequency of the rigid body resonance is not limited to the type of the inner clearance 36 that surrounds continuously and annularly the circumference of the inner member 21 when viewed in the axial direction, and it may be formed by arranging intermittently a plurality of apertures of a circular arc shape on one hypothetical ring.

In this case, the outer frame section 20 and the inner member 21 are integrally connected by the elastic vibration isolating main body 23, and the apertures, when viewed in the axial direction, have opening portions of a circular arc shape and are arranged at spaced intervals in the circumferential direction on the hypothetical ring. Each of the apertures is formed in the shape of a hole which extends in the axial direction of the inner member 21 within the elastic vibration isolating main body 23.

By the way, the arrangement in the circumferential direction of the apertures is not limited to the concentric arrangement on one hypothetical ring, and the apertures may be arranged in a zigzag fashion or the like when viewed in the axial direction, for instance. When configured in this way, the outer structure section 29 and the inner member 21 can be integrally combined, and the adjustment of the spring in the axial direction can be easily carried out by adjusting the number and sizes of the apertures.

Further, the apertures may be formed by through holes which pass through the elastic vibration isolating main body 23 in the axial direction of the inner member 21. It also may be formed by bottomed holes which end in the axial direction of the inner member 21, by provision of the connecting section 70 as seen in the third embodiment. In addition, It may be formed by the combination or mixture of the bottomed holes and the through holes. When the bottomed holes are mixed with the through holes, the adjustment of the spring in the axial direction can be more easily performed.

Further, the clearance may be formed in the shape of a noncircular ring (for instance, an oval ring) when viewed in the axial direction. In the case where the plurality of apertures are arranged intermittently in the circumferential direction, they may be arranged in the shape of noncircular hypothetical ring.

Moreover, the outer structure section 29 may be integrally formed only by the outer frame section 20 and the elastic vibration isolating main body 23 without adopting the intermediate ring 22.

Furthermore, the retainer flange 32 (41, 42) in the axial direction may be provided on only one end without providing on both ends in the axial direction. In addition, although the retainer flange overlaps with the axial end (the outside portion) of the outer structure section 29, it may be configured to overlap with a side surface of the elastic vibration isolating main body 23 or the outer frame section 20 each of which constitutes the outer structure section 29, without overlapping with the intermediate ring 22. In this case, the gap 37 in FIG. 7 is formed between the retainer flange and the outer structure section 29 other than the intermediate ring 22.

Moreover, the vibration isolating device of the present invention may be applied to various devices including not only the torque rod and the engine mount but also a suspension mount, etc.

What is claimed is:

1. A vibration isolating device comprising:
    an outer frame section,
    an inner member being arranged on an inside of the outer frame section,
    an elastic vibration isolation main body being arranged between the outer frame section and the inner member, wherein the outer frame section and the elastic vibration isolation main body are integrated into an outer structure section, and
    an inner clearance which is configured to surround the inner member, being provided between the outer structure section and the inner member,
    a retainer flange that projects outwardly in a radial direction, said retainer flange being provided on at least one end in an axial direction of the inner member, wherein;
    an outer circumference covering section of an elastic member being provided to cover an outer circumference of the inner member,
    the retainer flange is provided integrally with, and is adapted to be folded back with, the outer circumference covering section of the elastic member covering the outer circumference of the inner member; and,
    the retainer flange is folded back when the inner member is pressed into a through hole arranged on the outer structure section for passing the inner member.

2. The vibration isolating device according to claim 1, further comprising an intermediate ring that is configured to surround the inner member, being arranged between the outer frame section and the inner member, wherein the intermediate ring and the elastic vibration isolation main body are integrated into the outer structure section.

3. The vibration isolating device according to claim 2, further comprising an inner circumferential surface of the outer structure section being formed of the intermediate ring, wherein the inner clearance is formed between the outer circumference covering section and the intermediate ring.

4. The vibration isolating device according to claim 3, wherein zero clearance is provided between the retainer flange and an axial end of the intermediate ring.

5. The vibration isolating device according to claim 1, wherein the elastic vibration isolation main body is provided with axially extending through bored holes located on each side of the inner member in a main vibration inputting direction, and a portion between the bored holes is formed into a rubber foot section.

6. The vibration isolating device according to claim 1, further comprising a gap being provided between the retainer flange and the outer structure section.

7. The vibration isolating device according to claim 1, wherein an end in the axial direction of the outer circumference covering section is provided with a recess of a small diameter for folding and accommodating the retainer flange.

8. The vibration isolating device according to claim 1, wherein the inner clearance is formed in the shape of a ring extending around a full circumference in a circumferential direction and over a full length in the axial direction of the inner member, and the outer structure section and the inner member are separated in such a manner as to be movable relative to each other without sliding resistance.

* * * * *